Figure 1:
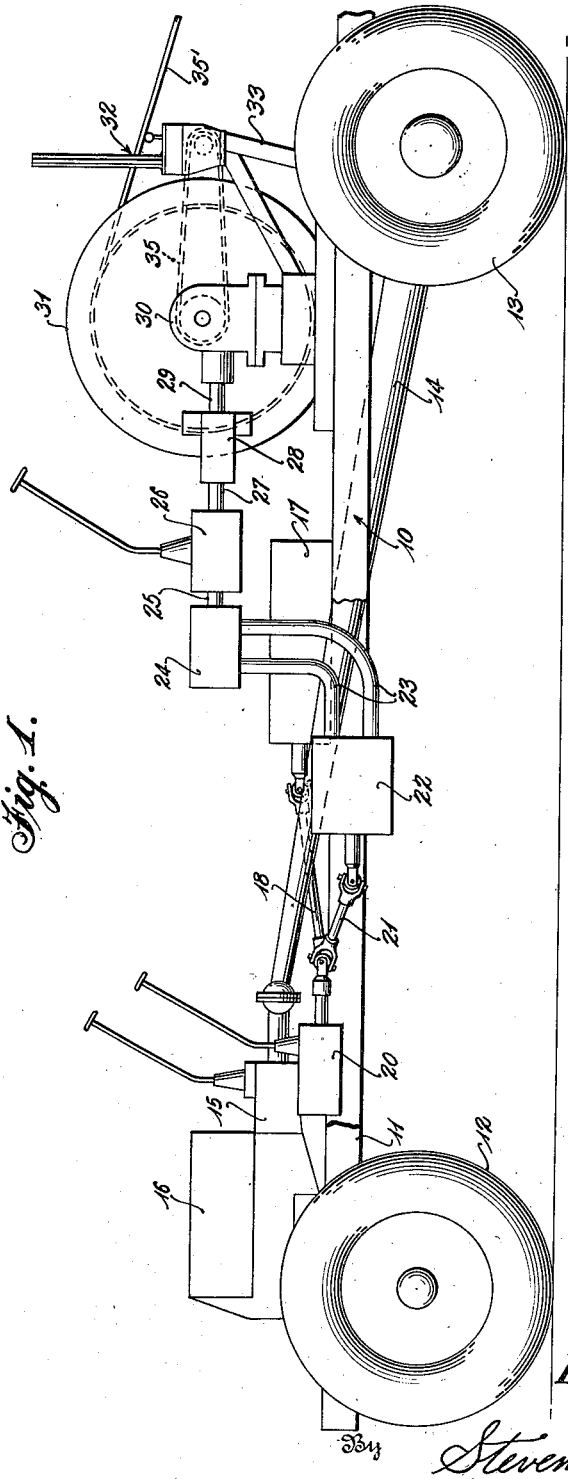

Jan. 19, 1943.  E. H. OLMSTEAD  2,309,004
WELL LOGGING WINCH TRUCK
Filed Oct. 28, 1940   2 Sheets-Sheet 1

Inventor
Edwin H. Olmstead
By Stevens and Davis
Attorneys

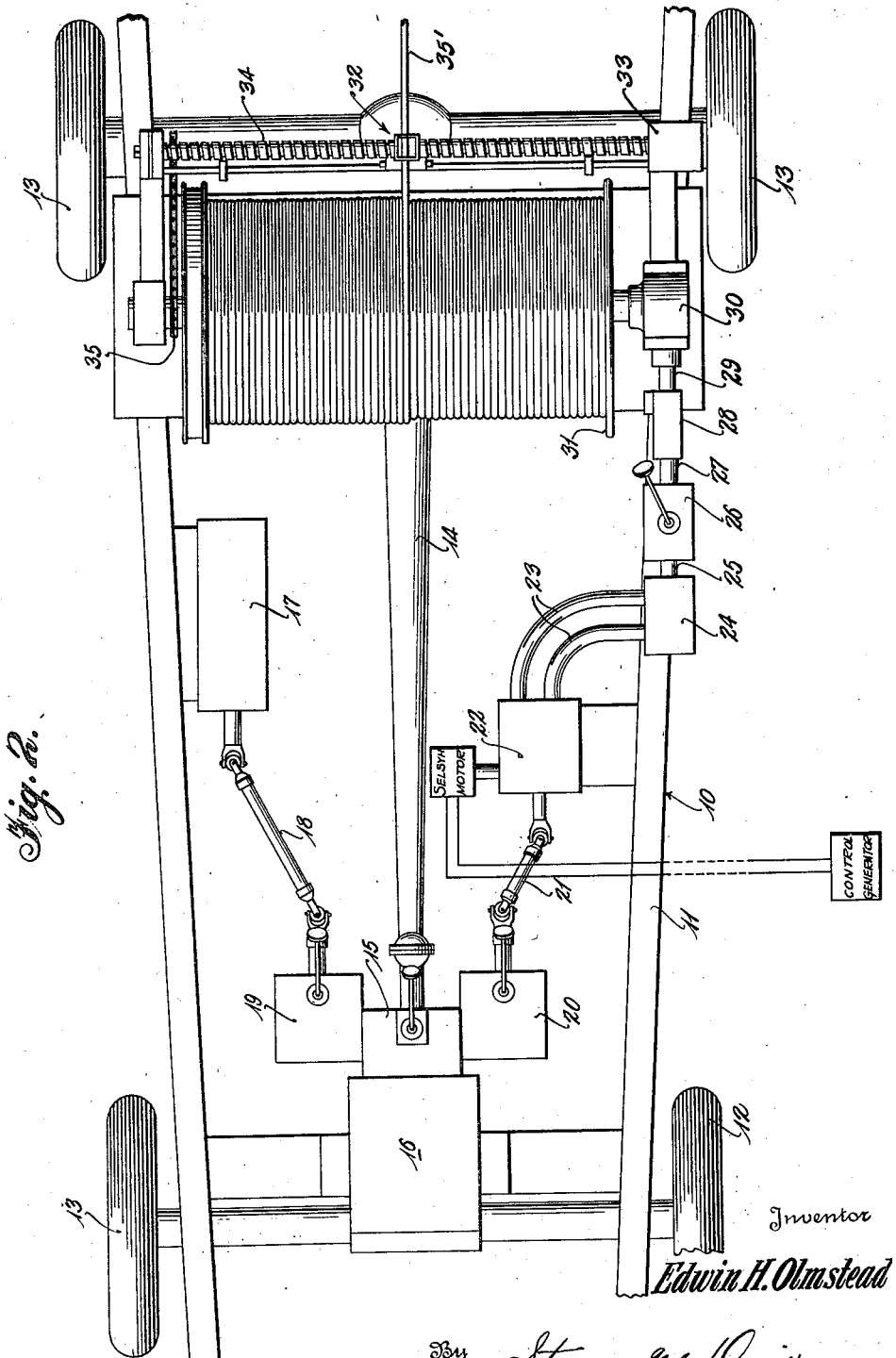

Patented Jan. 19, 1943

2,309,004

UNITED STATES PATENT OFFICE 2,309,004

WELL LOGGING WINCH TRUCK

Edwin H. Olmstead, Tulsa, Okla., assignor to Well Surveys, Incorporated, Tulsa, Okla., a corporation of Delaware Application October 28, 1940, Serial No. 363,197

1 Claim. (Cl. 254—166)

This invention relates generally to well-logging apparatus and is especially concerned with a new and improved cable truck including means for facilitating cable manipulation during logging operations.

In present day methods of well-logging, it is customary to perform the logging operations periodically during brief interruptions in drilling of the well. Because substantial continuity of drilling operations is generally considered desirable, considerable effort and ingenuity has been applied to the design and manufacture of well-logging equipment with a view to securing maximum availability and ease of operation without sacrifice of portability, a factor of importance since the logging equipment must be readily movable from well to well. In accordance with present practice, well-logging equipment is usually mounted on two trucks, one of which carries a portable testing laboratory complete with suitable recording and other instruments, and the other of which, the cable truck, carries the power supply for the unit, together with a testing cable and winch for reeling and unreeling the same whereby testing devices for operating the recording instruments can be moved within the well. It is to improvements in the last mentioned type of well-logging truck that this invention is directed.

Most types of well-logging cable trucks now commonly in use comprise a vehicle chassis upon which is mounted at least one prime mover, which can be either a spark ignition or compression ignition internal combustion engine, which serves as a source of power for moving the truck and as a means for driving the winch upon which the testing instrument suspension cable is carried, together with the winch, cable storage reels and supplementary equipment. The winch and truck may be driven by a common prime mover or individual units may be provided for independent operation.

The cable used for these purposes usually includes, in addition to the strands necessary to impart physical strength and ruggedness, one or more electrical conductors for conveying signals from the measuring instrument to various recording devices commonly located on the earth's surface in the vicinity of the well bore head, preferably in the portable laboratory mentioned above. Because of these factors, the cable mass per unit length is frequently rather high, considering its size, being often in the vicinity of a sixth of a pound to as much as a pound per foot, hence the total mass of a cable used in logging an average well is usually about one to two and a half tons, and in the instance of deep wells, may reach as much as seven to eight tons. The mass of the cable accordingly presents problems in the construction of a well-logging truck inasmuch as the load of the fully reeled cable must be distributed with substantial uniformity between the load-carrying wheels of the vehicle without removing the winch so far from one end of the truck as to make manipulation of the cable inconvenient. Moreover, as the cross-sectional area of a typical cable of this nature is about nine-tenths of a square inch, the handling of the cable when suspended in a deep well presents additional problems because a sudden jerk can break the cable requiring cessation of all operations until the cable can be retrieved and either restored to operative condition or replaced. A further problem of even greater importance arises from the fact that strain of the cable, even though within its elastic limits, can and frequently does cause damage of the electrical conductors or the insulation provided for the same, thus necessitating replacement of the cable.

The first mentioned of these problems is presented because of the conflict between the desire to position the cable carrying winch at the extreme end of the truck whereby the horizontal force component of the cable pull can be substantially minimized, by positioning the winch directly above the well opening, and the desire to locate the winch midway between the front and rear vehicle wheels thereby reducing the load which would otherwise be carried by the rear wheels or at least balancing the load carried by the several wheels of the vehicle.

The second and third mentioned problems arise because many types of cable winches now commonly used in well-logging operations are provided either with variable gear transmissions resulting in faulty coupling of the winch drum to the driving means or are directly coupled to the driving means, thereby causing jerking of the cable during movement with the resulting disadvantages mentioned above. This jerking motion results not from lack of refinement of mechanical design or carefulness and accuracy of manufacture of the equipment, but instead stems either from the inherent qualities of variable gear power transmission systems which require stepwise instead of continuous change in transmission rate or, in the instances where direct drives are employed, from the non-uniform change of speed of the driving means. A further difficulty in moving long lengths of suspended cable with usual types of winches is caused by the comparatively large torque necessary to overcome the inertia of the cable when initiating or changing direction of movement which when built up stepwise causes a severe jerk of the cable. A need has accordingly long been experienced in this field for a method of coupling a cable winch to driving means whereby power could be applied and increased or diminished by individually imperceptible increments or decrements thereby substantially avoiding jerking of the cable.

The present invention overcomes the first of the above mentioned problems confronting the prior art by providing a well-logging cable truck wherein the cable-carrying winch is mounted near but slightly in front of the rear wheels of the vehicle thereby distributing a portion of the resultant load onto the front wheels, while minimizing necessity for a large horizontal load component when reeling or unreeling lengths of cable. The well-logging cable truck according to this invention also includes a portable electrical power generating unit driven by the prime mover which, being located between the front and rear wheels of the vehicle but in front of the winch, counteracts torque due to the cable weight when suspended within a well, thereby further assuring stability of the equipment during use. Additionally, the current-generating unit provides a source of power for lighting of night operations and/or heating or cooling of the portable laboratory, in addition to supplying current for other uses at the scene of operations.

The present invention overcomes the second and third mentioned group of problems by providing a well-logging cable truck including a winch mounted thereon and powered from the vehicle prime mover through a variable transmission which can be started, stopped and reversed in direction of rotation without jerking of the cable, and which in one instance by test was found to be capable of speed variation by individually imperceptible increments and decrements corresponding to a range of cable speeds of 100 feet per hour to 12,000 feet per hour.

Regarded in certain of its aspects, the novel cable truck according to this invention comprises a vehicle chassis mounted on wheels driven by a prime mover, provided with an electrical power generating unit associated through an appropriate gear transmission system with the prime mover, and a cable winch driven by the prime mover through an infinitely variable fluid transmission system comprising a variable displacement pump connected to the prime mover by a power take-off unit which drives a hydraulic motor controlling operation of the winch.

To facilitate a better understanding of the matter of this invention a representative embodiment thereof is herein illustrated but it is clearly to be understood that the same is provided by way of example and not by way of limitation.

Referring then to the drawings,

Figure 1 is a substantially diagrammatic side elevational view of a well-logging cable truck according to this invention; and Figure 2 is essentially a top plan view of the same.

The herein illustrated cable truck vehicle, designated generally by the numeral 10 comprises a vehicle chassis frame 11 mounted upon conventional front and rear wheels 12 and 13 respectively, the latter being coupled through means including a jack shaft 14 and a gear transmission box 15 with a prime mover 16. The prime mover can be either an ordinary internal combustion engine or the equivalent thereof. It is to be understood that the engine is provided with a governor controlling fuel admission or otherwise controlling the engine operation whereby upon occasion the engine may be run at a substantially constant speed despite fluctuations of load.

As has been hereinabove mentioned, it is highly desirable during well-logging operations to have available a source of electric power and for this purpose a generator 17 is provided in the cable truck according to this invention which is driven through a universal coupling shaft 18 connected to a power take-off unit 19 which interengages with the shaft or fly-wheel of the engine 16 in a manner such that the generator can be operated independently of the jack shaft 14. It is preferred that the generator be of the type delivering alternating current, inasmuch as it is possible from a practical standpoint to operate the motor 16 at a speed sufficiently constant to assure uniform frequency of generated current. The current delivered from the generator is distributed to the portable laboratory or to other places of use by means including a panel and appropriate connector lines (not shown).

A second power take-off unit 20 driven by the engine 16 is connected through the universal coupling shaft 21 to a variable displacement pump 22 mounted upon a portion of the chassis 11. Although it has been found that a variable displacement pump of the type provided with a continuously variable by-pass between the input and output lines is especially well suited for use in pursuance of this invention, other types of variable displacement pumps, such as a variable stroke pump or the like, may be used if desired. It is of prime importance, however, that the effective displacement of the pump be smoothly and continuously variable over a wide range for reasons which will hereinafter be apparent.

The input and output of fluid to the pump 22 passes through the lines 23 connected to a hydraulic motor 24. The motor can be of either a constant or variable displacement type but it has been found that satisfactory results are achieved by using the constant displacement type of motor provided the effective displacement and capacity of the pump 22 are variable within wide limits. The drive shaft 25 of the motor 24 is directly connected to a selective gear transmission box 26 from which power is transmitted through a shaft 27 to torque-multiplying worm gears 28 which in turn are connected through a shaft 29 to a worm gear drive unit 30 directly connected to a winch drum 31 substantially as shown. The winch drum is rigidly supported upon the chassis 11 and extends transversely across the same in a locality above and in front of the rear truck wheels 13 whereby a component of the load resulting from the weight of the winch drum and cable carried thereon is carried by the front truck wheels 12.

A traversing mechanism generally designated by the reference character 32 is mounted upon a supporting frame 33 whereby the assembly extends across the front of the drum substantially as shown. The traversing unit comprises a driven lead screw 34 rotated by means including a chain drive 35 operated by rotation of the drum 31 and suitable reversing mechanism whereby cable can be laid upon the winch drum in a substantially uniform manner. For purposes of illustration, a length of cable 35' is illustrated as passing through the traversing mechanism 32 and being wound upon the winch drum 31.

In use the hereinabove described cable truck is positioned in the vicinity of the well to be logged and after the truck has been suitably blocked to prevent undesired movement, the engine is adjusted for constant speed operation and the generator coupled through the power take-off unit 19 whereby the generated current can be used for operation of auxiliary equipment. The pump 22 is then adjusted for zero displacement, that is to say, if it is a by-pass type of pump, the by-pass is fully opened and the power take-off unit 20 is then engaged whereby the pump is operated at a constant speed. Assuming that an instrument is to be lowered into a well, the instrument is attached to a loose end portion of the cable 35' and positioned within the mouth of the well bore for lowering by operation of the winch. Next, the selective gear transmission box 26 is adjusted for proper direction of rotation of the winch drum and motion of the drum itself is initiated by adjusting the displacement of pump 22. It will be observed that the worm gears 30 and 28 serve to prevent unreeling of the cable during adjustment of the selective gear transmission 26, said transmission serving both to control the direction of rotation of the winch drum and also, broadly and in a stepwise manner, the speed ratio of the motor drive shaft 25 and the drive shaft 27.

In withdrawing the cable from the well, the pump 22 is again adjusted for zero displacement and the gear transmission unit 26 is adjusted for reversal of rotation of the winch drum and thereafter motion of the winch drum is initiated by adjustment of the displacement of the pump 22. By this means the cable readily can be moved without jerking at widely varying velocities.

In some instances it is desirable to control the rate of movement of the cable from a location remote with respect to the cable truck. This can readily be accomplished with the cable truck according to this invention by using a Selsyn motor system or similar remote control for operation of the variable displacement pump. This has proven to be a very useful expedient in those instances wherein the velocity of cable movement is to be controlled from the portable laboratory since in this manner delays incidental to manual operation are eliminated.

I claim:

In a winch truck of the type employed in oil well logging for receiving the electrical cable used in suspending the logging instrument including a chassis mounted on wheels connected through a drive shaft with a prime mover, the improvements which comprise a cable receiving winch transversely mounted adjacent the rear of the chassis, a cable-guiding traversing means mounted near and cooperating with the winch for facilitating uniform distribution of cable during winding upon the winch, a smoothly continuously variable fluid power transmitting means coupling the winch to the prime mover, said means comprising a hydraulic motor connected to the winch for driving the same, a variable stroke pump driven by the prime mover for operating the motor whereby alteration of the pump stroke causes change in the rate of operation of the motor, and a remote control for altering the stroke of said pump whereby the rate of operation of the motor can be adjusted from a location distant from the truck.

EDWIN H. OLMSTEAD.